May 24, 1927. Re. 16,637
B. D. WILLIS
INTEROFFICE TRUNK CIRCUITS FOR TELEPHONE SYSTEMS
Original Filed June 18, 1920
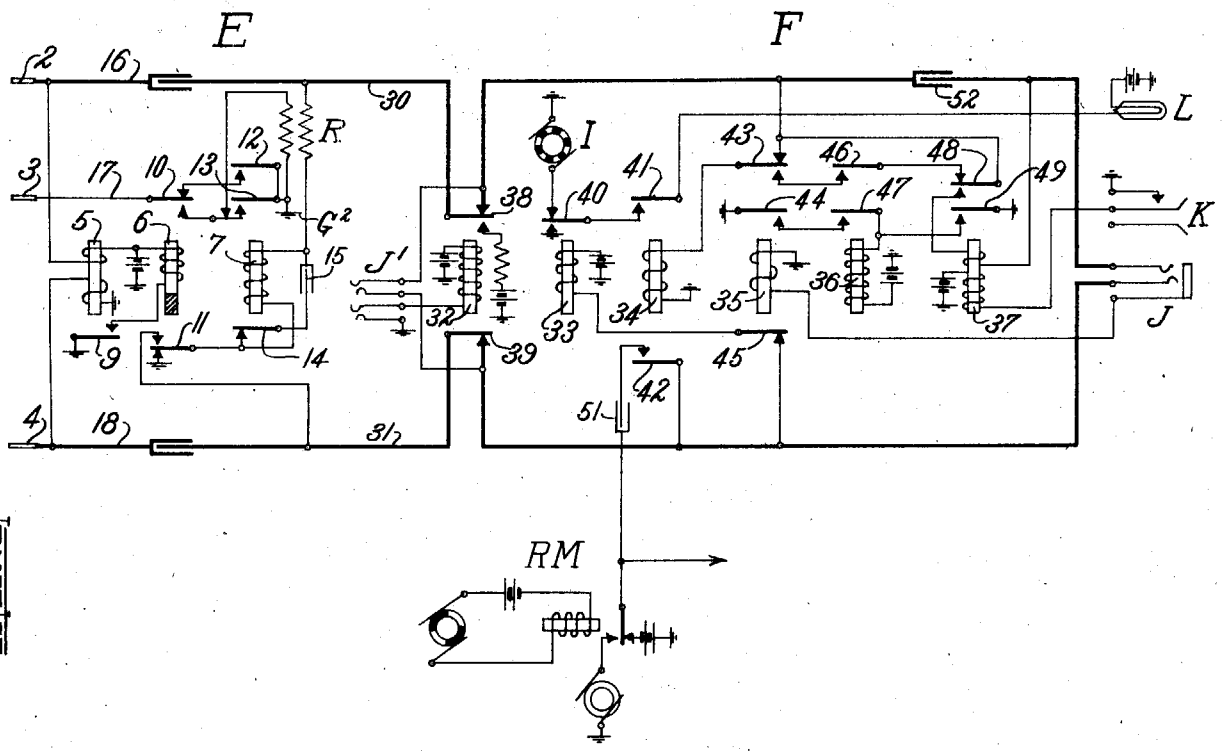
Inventor
Bernard D. Willis
R. B. Richardson Atty.

Reissued May 24, 1927. Re. 16,637

UNITED STATES PATENT OFFICE.

BERNARD D. WILLIS, OF OAK PARK, ILLINOIS, ASSIGNOR, BY MESNE ASSIGNMENTS, TO AUTOMATIC ELECTRIC INC., OF CHICAGO, ILLINOIS, A CORPORATION OF DELAWARE.

INTEROFFICE TRUNK CIRCUITS FOR TELEPHONE SYSTEMS.

Original No. 1,495,059, dated May 20, 1924, Serial No. 389,820, filed June 18, 1920. Application for reissue filed January 30, 1926. Serial No. 85,034.

My invention relates in general to interoffice trunk circuits for telephone systems, but more especially to trunk circuits for connecting automatic offices with manual offices in the same system, and the object of the invention is the provision of an improved automatic to manual trunk circuit which is particularly useful for temporarily connecting automatic and manual offices during a cut over from one system to the other, or for permanently connecting such offices when automatic and manual systems serving the same territory are consolidated.

Trunk circuits of the above character are not broadly new, and the invention necessarily consists in certain principles of operation which are thought to be new, and in the various circuit improvements employed for carrying out these principles.

The invention will be described with reference to the accompanying drawing which is a circuit diagram of an interoffice trunk circuit embodying the principles of the invention.

Referring to the drawing, the reference characters 30 and 31 indicate the two conductors of an inter-office trunk line. This trunk line extends from the so called repeater E which is located in an automatic office to an answering jack J at an A operator's position in a manual office, and is one of a group of similar trunk lines which are provided to handle the traffic from the automatic office to the manual office. Another group of trunk lines, of a different type, is provided for handling traffic in the other direction, but with these other trunks the present invention is not concerned. In order to give the automatic subscribers access to the trunk lines extending to the manual office these trunk lines are multipled in the banks of selector switches in the usual manner. Thus the trunk line shown in the drawing may be reached by way of bank contacts 2, 3, and 4, which may be located in the bank of a first selector switch, being connected in multiple to similar contacts in the banks of the other first selectors in the automatic office. The automatic switches are of the well known Strowger vertical and rotary type, operated according to the well known two wire system of control such as disclosed in U. S. Patent No. 1,281,112, granted to B. D. Willis, October 8, 1918, and the repeater E is provided to establish a holding circuit for any selector which is operated to establish connection with the trunk line associated therewith. This is in accordance with the usual practice and is done primarily to avoid the necessity of having three conductors between offices.

As stated before, the answering jack J is located at an A operator's position in the manual office. The particular A operator in front of whom this jack appears may handle trunked calls exclusively, or the jacks associated with the incoming trunks from the automatic office may be distributed among a plurality of operator's positions. In any case, the trunked calls are handled substantially like local calls originating in the manual office and the operator, or operators, have uniform supervision. Cord circuits such as disclosed in the fourth edition of American Telephone Practice, on page 315, may be used. The group of relays indicated by the reference character F are the trunk relays, are located at the manual office, and their functions and operations will be described fully hereinafter.

For this purpose it will be assumed that a subscriber in the automatic office desires to obtain connection with a subscriber in the manual office, and the process of setting up the connection will be described. When the receiver is removed the calling line is extended by means of an individual line or trunk selecting switch to an idle first selector switch in the usual and well known manner. The manual subscribers may have full telephone numbers listed in the directory, the first digit in each number being the office digit, and the remaining digits corresponding to the location of the line in the multiple at the manual office, and the calling subscriber will now operate his calling device for the first digit in the desired number. By this means the first selector is directively controlled to raise its shaft step by step until the wipers stand opposite the level which is reserved for the trunks extending to the desired manual office. At the end of the vertical movement of the selector the rotary trunk selecting movement is initiated automatically and the wipers are rotated step by step in search of an idle trunk line.

Assuming that the trunk line shown in the drawing is the first idle trunk line, when the wipers arrive at bank contacts 2, 3, and 4 the rotary movement will cease and by the operation of the switching relay in the selector the calling line will be extended by way of the selector line wipers, bank contacts 2 and 4, and conductors 16 and 18 to the upper and lower windings, respectively, of the double wound line relay 5 of the repeater E.

Upon the extension of the calling line as above described the line relay 5 is energized over the line circuit and closes a circuit for the slow acting release relay 6 at its armature 9. Upon energizing, relay 6 closes a holding circuit which may be traced from ground $G^2$ by way of the left hand winding of induction coil R, normally closed contact springs controlled by armature 13, working contact of armature 10 and the said armature, release trunk conductor 17, test contact 3, test wiper of the operated first selector, and the winding of the switching relay in said selector to battery. This circuit serves to maintain the selector in operated position during the call and it may be added that a branch of the above circuit performs the same function for the subscriber's individual line switch. It will be understood also that the ground potential on test contact 3 extends to multiple test contacts in the banks of other selector switches thereby rendering the trunk line busy.

The calling subscriber may now operate his calling device in accordance with the remaining digits of the desired number. As a result the line relay 5 is deenergized a plurality of times for each digit, but without effect, and the digits are wasted. The A operator at the manual exchange, however, has already been signaled. When relay 6 pulls up it closes a bridge across trunk conductors 30 and 31 which includes the right hand winding of induction coil R and the winding of relay 7. It follows that relay 7 will be energized in series with relays 33 and 34 at the manual exchange, the latter two relays being bridged across the trunk line in series with the battery. Upon energizing, relay 7 grounds the holding circuit direct at its armature 13 and thus cuts out the left hand winding of the induction coil R. At the manual exchange the relays 33 and 34 jointly close a circuit for the answering or call signal lamp L. At the same time relay 34 connects up a lead from the ringing machine RM. Condenser 51 is of very low capacity, preferably about .006 M. F., and permits just enough ringing current to leak back through the receiver at the calling station to give the calling subscriber the usual ringing current induction. This arrangement is customary in automatic systems and is provided here for the sake of uniformity. Hearing the signal, the calling subscriber will understand that the desired line is being signalled and will wait on the line, although, as a matter of fact, the ringing machine has nothing to do with the signalling operation that has actually been performed.

When the operator sees the lighted answering lamp L, she will understand that a call has been received over the associated trunk line and will respond by plugging into the jack J with an idle cord circuit. This lights the supervisory lamp in the cord circuit and energizes the sleeve relay 35. Relay 35, upon energizing, prepares a locking circuit for relay 36 at its armature 44, and at its armatures 43 and 45 disconnects relays 33 and 34 from the trunk line. This causes the answering lamp L to be extinguished, and also disconnects the ringing machine RM. At the same time relay 7 at the repeater E deenergizes and connects the left hand winding of repeating coil R into the holding circuit again.

The operator will now throw her listening key and will note whether or not there is a discriminating tone on the line. This operation is necessary of course only in case a charge is made for inter-office calls, which the operator is required to record. Any subscriber whose credit is poor and who is to be denied inter-office service on that account has his individual line switch circuit so arranged that a distinctive audible tone is placed on the holding circuit whenever a call is attempted. This tone is transferred to the line at the repeater E by means of the repeating coil R and when heard by the operator is sufficient authority for her to refuse to complete the connection. Reference is made at this time to my U. S. Patent No. 1,281,112, granted Oct. 8, 1918, which shows and describes in full an arrangement of this kind. In order to proceed with the explanation we will assume that no tone is heard by the operator when she comes in on the line, which means that the calling subscriber is entitled to service. The operator will therefore obtain the desired number from the calling subscriber and will proceed to complete the connection with the other end of her cord circuit, either directly or with the assistance of a B operator, depending on the particular type of manual exchange in use. The connection having been established the operator will actuate key K momentarily and need pay no further attention to the call, unless recalled by the supervisory signals in the cord.

When key K is operated a circuit is closed for relay 37 which, upon energizing, closes a circuit for relay 36 at armature 49. Upon energizing, relay 36 locks itself at armature 47 and at armature 46 prepares a circuit for relay 34. In addition to closing the circuit of relay 36, relay 37 connects its upper winding in shunt of condenser 52 by means of its armature 48. Condenser 52 is included in the upper conductor of the trunk line, normally preventing current flow from the cord circuit; and it follows that when the condenser is shunted by the winding of relay 37, the said relay will be locked up by current flow over a circuit which includes the battery at the cord circuit and the relay 7 at the repeater E. Relay 7 is accordingly energized again to cut out the left hand winding of induction coil R, and at the cord circuit the supervisory relay is energized to put out the supervisory lamp. It may be mentioned also that relay 7 disconnects the condenser which is normally bridged around its winding in order to give a good circuit for the distinctive tone, when the tone is on the line.

The complete connection has now been established and when the called subscriber in the manual office answers the conversation can begin.

When the subscribers are through talking they will both replace their receivers. When the called subscriber hangs up the operator is given the usual disconnect supervision at the calling end of the cord circuit. When the calling subscriber hangs up the line relay 5 at the repeater E is permanently deenergized and falls back to break the circuit of the slow acting release relay 6. The latter relay then deenergizes also, the holding circuit is broken, and the first selector and individual line switch are released. Relay 6 also opens the bridge across the trunk conductors 30 and 31 at the repeater and relay 7 and the supervisory relay in the answering end of the operator's cord circuit are deenergized. The latter relay permits the answering supervisory lamp to be lighted also and the operator now has a disconnect signal at both ends of her cord circuit. At the same time that the supervisory relay falls back the relay 37 deenergizes and thereby disconnects its upper winding from in shunt of condenser 52. Relay 36, however, remains locked up.

The operator may now pull down the connection and if she does so relays 35 and 36 will be deenergized and all the apparatus will be in normal position. However, in order to complete the explanation, we will assume that another call is received over the same trunk line before the operator has had time to disconnect. Sometimes, especially during rush hours, the operators are rather slow at pulling down connections, and this may well occur. When the second calling subscriber connects with the trunk line the line and release relays 5 and 6 are energized as before and the bridge including relay 7 is closed across the trunk line at the outgoing side of the repeater E. As a result a circuit is closed for relay 34, which is now connected to the upper line conductor by way of armatures 43, 46, and 48, for although relay 33 is disconnected, the lower line conductor goes to battery at the manual exchange, nevertheless, because the cord is still up.

The supervisory relay at the cord circuit is included in the lower talking strand, which goes to the ungrounded pole of battery and it follows that relays 34 and 7 and the supervisory relay in the cord will be energized in series. This puts out the supervisory lamp and removes one of the disconnect signals. Relay 34 being now operated the circuit of the answering lamp L is closed but since relay 33 is at normal the lamp circuit will be closed through the interrupter I. This causes the lamp to flash which is more effective in recalling the operator than a permanent signal would be.

On perceiving the flashing line lamp the operator will replug in order to restore the circuits to the usual call received condition: That is, she will withdraw the plug from jack J for an instant in order to deenergize relays 36 and 35. When the plug is reinserted relay 35 will pull up again, but not relay 36, and relay 34, which falls back when the plug is withdrawn, will remain deenergized. The circuits are now in the same condition as they were in the case previously described, when the trunk line was first taken for use, and the operator will proceed according to the usual routine.

Although it is not essential, I have shown a test jack J′ which is provided for the convenience of a switchboard man or other employee in testing the trunk circuit. These test jacks may be mounted on the relay racks in the terminal room and afford ready access to the trunk circuits. When the jack J′ is connected with, a telephone or other testing device is bridged across the two upper springs of the jack while the two lower springs are short circuited. The latter operation energizes relay 32 which pulls up and opens the two sides of the trunk line, leaving the test telephone bridged across the line in the direction of the operator. The person testing can now talk to the operator and ascertain if the trunk line is working or not. Relay 32 also connects the ungrounded pole of battery to the upper trunk conductor 30. Relay 6 at the repeater E being at normal, relay 7 is now energized by current flow over the upper trunk conductor and at its armature 12 connects ground to the release trunk conductor 17. This renders the trunk line busy. It will be understood that if the trunk circuit should get out of order so that it would become necessary to establish a more permanent busy condition, the lower springs of the test jack can be short circuited by means of any small metallic object which may be left in place until the circuit is repaired.

Having described my invention what I consider to be new and desire to have protected by Letters Patent will be pointed out in the appended claims.

What I claim as my invention is:

1. In a telephone system, a trunk line extending to an operator's position, means whereby a calling subscriber can connect with said trunk line, a call signal at the operator's position, means for operating said signal steadily when the call is received, means at the operator's position for connecting said trunk line with a called line, means whereby the calling subscriber can disconnect from said trunk line, and means whereby if a second connection to said trunk line is established by a calling subscriber before the trunk line is disconnected from the called line the said call signal will be operated intermittently.

2. In a telephone system, a trunk circuit terminating in a jack at an operator's position, means including automatic selectively movable switches whereby a calling subscriber can extend a connection to said trunk line, a call signal lamp at the operator's position and means for causing the same to glow steadily when the connection to said trunk is established, means whereby the operator can connect said trunk line with a called line, means whereby the calling subscriber can release said switches, and means for flashing said call signal lamp in case a second calling subscriber should connect with said trunk line before the operator has disconnected the same from the called line.

3. In a telephone system, a trunk line connecting automatic and manual exchanges, means including automatic switches whereby a calling automatic subscriber can connect with said trunk line, a repeater in said trunk line for closing a holding circuit for said switches and for closing a bridge across the outgoing side of said trunk line, a relay and a battery normally in bridge of said trunk line at the manual exchange, the said relay being actuated when the first bridge is closed to signal the operator, means for disconnecting said second bridge when the operator plugs in to answer the call, a condenser in one conductor of said trunk line preventing current flow from the operator's cord circuit, a relay in said first bridge which is deenergized when the second bridge is cut off, a signalling device for indicating the character of the calling line connected in inductive relation to the trunk line to give the operator an audible signal when said second relay falls back, and a key actuated by the operator for short circuiting said condenser, whereby the said second relay is energized by current from the operator's cord circuit and the said signalling device is rendered inoperative.

4. In a telephone system, a trunk line extending to an operator's position, means whereby a calling subscriber can connect with said trunk line, a call signal at the operator's position, a pair of relays in said trunk line, means dependent upon the condition of said trunk line for determining whether one or both of said relays will be operated when a call is received, means responsive to the operation of only one of said relays causing the intermittent operation of said signal, and means responsive to the operation of both of said relays causing the steady operation of said signal.

5. In a telephone system, lines of different classes, an operator's switchboard, a trunk line terminating in a jack on said switch board, a cord circuit at said switch board, means including an automatic switch adapted to be set under the control of any calling subscriber for connecting such subscriber's line to said trunk line, means automatically responsive to the insertion of the plug of said cord circuit in said jack for signalling the operator over said trunk line to indicate the class of the calling line, said signalling means including a relay at the seized end of said trunk line for stopping the signalling operation, and a circuit controlled by the operator at said switch board for energizing said relay and maintaining the same energized to permit conversation with the calling subscriber.

6. In a telephone system, lines of different classes, an operator's switch board, a trunk line terminating in a jack on said switch board, a cord circuit at said switch board, means including an automatic switch adapted to be set under the control of any calling subscriber for connecting such subscriber's line to said trunk line, class signalling means associated with the seized end of said trunk line, means including a relay energized when the trunk is seized and automatically deenergized responsive to the insertion of the cord circuit plug in said jack for rendering said signalling means effective to indicate the class of the calling line to the operator, and means controlled by the operator thereafter for again energizing said relay to stop the signalling operation.

7. In a telephone system, lines of different classes, an operator's switch board, a trunk line terminating in a jack on said switch board, a cord circuit at said switch board, means including an automatic switch adapted to be set under the control of any calling subscriber for connecting such subscriber's line to said trunk line, class signalling means associated with the seized end of said trunk line, a battery bridged across said trunk line at the switch board end thereof, a relay bridged across the seized end of said trunk line and responsive to current from said battery to render said signalling means ineffective, means for disconnecting said battery from in bridge of the trunk line responsive to the insertion of the cord circuit plug in said jack, thereby deenergizing said relay to permit said signalling means to become effective to indicate the class of the calling line to the operator, and a circuit established thereafter under operator control for supplying current to said relay from said cord circuit, whereby the relay is again energized to render the signalling means ineffective.

8. In a telephone system, a trunk line extending to an operator's position, means whereby a calling subscriber can connect with said trunk line, a call signal at the operator's position, means for operating said signal in one manner when the call is received, means at the operator's position for connecting said trunk line with a called line, means whereby the calling subscriber can disconnect from said trunk line, and means whereby if a second connection to said trunk line is established by a calling subscriber before the trunk line is disconnected from the called line the said call signal will be operated in a different manner.

9. In a telephone system, a called line leading to an operator's position, a signal lamp on the called line at the operator's position, means for initiating a call on the calling line whereby the lamp will responsively energize as a calling signal, means for responding to the call at the operator's position and for thereby deenergizing the lamp, and means controlled from the calling line for reenergizing the lamp over a new circuit path regardless of the responded state of the called line being maintained.

10. In a telephone system, a called line leading to a jack on an operator's position, a calling signal device at the operator's position, an answering circuit at the operator's position, a calling station, means for connecting the calling station to the called line to cause the calling signal device to energize as a calling signal, means whereby thereupon connecting the answering circuit to the called line will complete a talking connection from the calling station to the answering circuit and automatically deenergize the signal device, means whereby the calling station can disconnect from the called line without affecting the calling signal device, and means whereby reconnecting the calling station with the called line will cause the calling signal device to energize to indicate a new call regardless of the answering circuit having been maintained as primarily connected with the called line elements.

11. In a telephone system, a called line leading to a jack on an operator's position, a calling signal device on the operator's position, an answering circuit at the operator's position, a first calling station, a second calling station, means for connecting the first calling station to the called line to cause the calling signal device to energize as a calling signal, means whereby thereafter connecting the answering circuit to the jack will complete a talking connection from the first calling station to the answering circuit and automatically deenergize the signal device, means whereby the first calling station can disconnect from the called line without affecting the calling signal device nor the answering circuit connections associated with the jack, and means whereby connecting the second calling station with the called line will cause the calling signal device to energize to indicate a new call regardless of the answering circuit having been maintained connected with the called line.

12. In a telephone system, a called line leading to an operator's position, a signal lamp on the called line at the operator's position, means controlled over the calling line for energizing the lamp as a calling signal, means for responding to the call at the operator's position and for thereby deenergizing the lamp, and means controlled from the calling line for reenergizing the lamp as a calling signal regardless of the responded state of the called line being maintained, without altering the state of the second said means.

13. In a telephone system, a called line leading to an operator's position, a signal device on the called line at the operator's position, means controlled over the calling line for energizing the signal device as a calling signal, means for responding to the call at the operator's position and for thereby deenergizing the signal device, and means controlled from the calling line for reenergizing the signal device as a calling signal regardless of the responded state of the called line being maintained, without altering the state of the second said means.

14. In a telephone exchange system, the method which comprises extending a calling line and seizing an idle connecting circuit in response to dialing impulses and in illuminating the lamp assigned to the selected connecting circuit regardless of whether the switching terminal of said connecting circuit is associated with a line with which it has previously established a connection.

In witness whereof, I hereunto subscribe my name this 28th day of January, A. D. 1926.

BERNARD D. WILLIS.